United States Patent
Zhang (10) Patent No.: US 10,298,464 B2
(45) Date of Patent: May 21, 2019

(54) NETWORK PERFORMANCE PREDICTION METHOD AND APPARATUS

(71) Applicant: Huawei Technologies Co., Ltd., Shenzhen (CN)

(72) Inventor: Yaokun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 487 days.

(21) Appl. No.: 15/061,757

(22) Filed: Mar. 4, 2016

(65) Prior Publication Data

US 2016/0191336 A1 Jun. 30, 2016

Related U.S. Application Data

(63) Continuation of application No. PCT/CN2014/083730, filed on Aug. 5, 2014.

(30) Foreign Application Priority Data

Sep. 6, 2013 (CN) .......................... 2013 1 0404729

(51) Int. Cl.
*H04L 29/08* (2006.01)
*H04L 12/24* (2006.01)
(Continued)

(52) U.S. Cl.
CPC ........ *H04L 41/147* (2013.01); *H04L 41/0604* (2013.01); *H04L 41/0695* (2013.01);
(Continued)

(58) Field of Classification Search
CPC ............... H04L 41/147; H04L 41/0604; H04L 41/0695; H04L 41/16; H04L 41/142;
(Continued)

(56) References Cited

U.S. PATENT DOCUMENTS 6,446,123 B1 * 9/2002 Ballantine ............... H04L 41/06
709/223
9,100,269 B2 8/2015 Allan et al.
(Continued)

FOREIGN PATENT DOCUMENTS

CN 1564533 A 1/2005
CN 101159669 A 4/2008
(Continued)

OTHER PUBLICATIONS

Yang et al., "An Evaluation Model for Network Risk Based on Cloud Theory" (Oct. 2010).
(Continued)

*Primary Examiner* — Chris Parry
*Assistant Examiner* — Stephen J Houlihan
(74) *Attorney, Agent, or Firm* — Leydig, Voit & Mayer, Ltd.

(57) ABSTRACT

The present application relates to a method and apparatus of predicting network performance, wherein the method includes: obtaining M performance parameter data of a link; calculating a cloud model digital feature of network performance of the link according to the M performance parameter data; calculating N predicted performance parameter data of the network performance of the link according to the cloud model digital feature; and raising a prediction alarm that the link has a risk of exceeding a limit if there is data exceeding a preset upper limit value in the N predicted performance parameter data, wherein M and N are preset positive integers. A change trend of network performance is analyzed according to real-time monitored data of the network performance of the link to predict future performance parameter data, and whether an alarm is raised and protection switching is performed is determined based on the prediction.

8 Claims, 3 Drawing Sheets

(51) Int. Cl.
  *H04L 12/26* (2006.01)
  *H04L 12/801* (2013.01)
(52) U.S. Cl.
  CPC ............ *H04L 41/142* (2013.01); *H04L 41/16* (2013.01); *H04L 43/16* (2013.01); *H04L 47/127* (2013.01); *H04L 41/0654* (2013.01); *H04L 41/5009* (2013.01)
(58) Field of Classification Search
  CPC ..... H04L 41/145; H04L 43/16; H04L 47/127; H04L 41/0654; H04L 41/5009
  See application file for complete search history.

(56) References Cited

U.S. PATENT DOCUMENTS

| | | |
|---|---|---|
| 2003/0108049 A1 | 6/2003 | Marilly et al. |
| 2005/0097207 A1 | 5/2005 | Gluhovsky et al. |
| 2011/0292834 A1 | 12/2011 | Agrawal et al. |
| 2012/0155254 A1* | 6/2012 | Hinosugi .............. H04L 49/557 370/228 |
| 2014/0043960 A1 | 2/2014 | Liao |

FOREIGN PATENT DOCUMENTS

| | | |
|---|---|---|
| CN | 101795187 A | 8/2010 |
| CN | 102035691 A | 4/2011 |
| CN | 102204223 A | 9/2011 |
| CN | 102263655 A | 11/2011 |
| CN | 102546222 A | 7/2012 |
| CN | 102780635 A | 11/2012 |
| CN | 103177186 A | 6/2013 |
| CN | 103178990 A | 6/2013 |
| CN | 103236953 A | 8/2013 |
| CN | 103259721 A | 8/2013 |
| CN | 103490948 A | 1/2014 |

OTHER PUBLICATIONS

Luo et al., "Network performance comprehensive evaluation model based on cloud model and entropy weight," Journal of Chongqing University of Posts and Telecommunications (Natural Science Edition), vol. 21, No. 6 (Dec. 31, 2009).

Fu et al., "Review and prospect on research of cloud model," Application Research of Computers, vol. 28, No. 2 (Feb. 28, 2011).

Bradner et al., "Benchmarking Methodology for Network Interconnect Devices," Network Working Group, Request for Comments 2544, IETF Trust, Reston, Virginia (Mar. 1999).

"Series G: Transmission Systems and Media, Digital Systems and Networks; Packet over Transport aspects—Ethernet over Transport aspects; Series Y: Global Information Infrastructure, Internet Protocol Aspects and Next-Generation Networks; Internet protocol aspects—Operation, administration and maintenance; OAM functions and mechanisms for Ethernet based networks; Amendment 1," Recommendation ITU-T G.8013/Y.1731, pp. i-8, International Telecommunication Union, Geneva, Switzerland (May 2012).

Shi et al., "The Research and Design of network security Evaluation Systems Based on cloud model," 9th International Conference on Fuzzy Systems and Knowledge Discovery (FSKD), pp. 2265-2269, Institute of Electrical and Electronics Engineers, New York, New York, (May 29-31, 2012).

Wu et al., "Research of Network Security Situation Prediction Based on Multidimensional Cloud Model," Sixth International Conference on Innovative Mobile and Internet Services in Ubiquitous Computing, pp. 409-414, Institute of Electrical and Electronics Engineers, New York, New York, (Jul. 4-6, 2012).

Li et al., "Study on the Network System Status's Assessment and Forecast Model Based on Cloud Model," Journal of Sichuan University (Engineering Science Edition), vol. 42, No. 6, Sichuan University, Chengdu, China (Nov. 2010).

* cited by examiner

NETWORK PERFORMANCE PREDICTION METHOD AND APPARATUS

CROSS-REFERENCE TO RELATED APPLICATIONS

This application is a continuation of International Patent Application No. PCT/CN2014/083730, filed on Aug. 5, 2014, which claims priority to Chinese Patent Application No. 201310404729.0, filed on Sep. 6, 2013, both of which are hereby incorporated by reference in their entireties.

TECHNICAL FIELD

The present application relates to the technical field of network communications, and in particular, to a method and an apparatus of predicting network performance.

BACKGROUND

A network carrying wireless, finance, electricity services and the like has a higher requirement of performance of a transmission network, such as time delay, jitter, packet loss rate, etc. In a wireless mobile carrier network, a time delay of data transmission between a base station and a radio network controller (Radio Network Controller, RNC) is generally required not to exceed 10 ms. If the time delay exceeds the range, service damage will be caused. Clients hope that an alarm can be given immediately and corresponding protection switching can be made.

At present, for a monitoring method of network performance quality (performance parameters such as time delay, jitter, packet loss rate and the like), taking the time delay as an example, it is only used for feedback of real-time or timing time delay data of a network in application, neither making prediction of future data according to current data trend nor analyzing historical data, and it per se does not have functions of time delay prediction and alarm and a function of making a protection switching function based on prediction data.

There are two kinds of uncertainty for network time delay: one is randomness: when a single message is forwarded in a network, a large time delay or a small time delay probably be produced, which has a certain randomness due to the influence of factors such as transient failure of a forwarding chip, transient instability of link quality and the like; the other is fuzziness: a size of the time delay itself is relative, so the fuzziness may exists in the definition of "large time delay". Therefore, current time delay algorithm may not completely reflect quality of the network time delay, but only an average value of the network time delay or an expected value of probability distribution. However, a clients' requirement such as "the time delay being not allowed to exceed 10 ms" is an upper limit value, and even though the expected value does not exceed the upper limit value, it may not be guaranteed that time delays of all message will not exceed the upper limit.

If an alarm or protection switching is not performed until the time delay of a link is detected to exceed the upper limit value, it is actually late since damage to a service has been caused. Therefore, the existing monitoring method of network performance quality cannot raise an alarm or make protection switching timely.

SUMMARY OF THE INVENTION

The present application provides a method and apparatus of predicting network performance, which analyzes a change trend of network performance according to real-time monitored data of network performance of a link to predict future performance parameter data of the network performance, and determines whether an alarm is raised and protection switching is performed based on the prediction, thus raising an alarm or performing protection switching timely.

In a first aspect, the present application provides a method of predict network performance, wherein the network performance prediction method includes:

obtaining M performance parameter data of a link;

calculating a cloud model digital feature of network performance of the link according to the M performance parameter data;

calculating N predicted performance parameter data of the network performance of the link according to the cloud model digital feature;

raising a prediction alarm that the link has a risk of exceeding a limit if there is data exceeding a preset upper limit value in the N predicted performance parameter data, wherein M and N are preset positive integers.

In a first possible implementation manner of the first aspect, in combination with the first aspect, the cloud model digital feature of the network performance of the link includes: an expected value $E_x$, an entropy $E_n$ and a hyper entropy $H_e$;

the calculating a cloud model digital feature of the network performance of the link according to the M performance parameter data, specifically includes:

calculating a sample mean of the M performance parameter data by using $$\overline{X} = \frac{1}{M}\sum_{i=1}^{M} x_i,$$

wherein $\overline{X}$ is the sample mean of the M performance parameter data, $x_i$ is the i th performance parameter data, and the sample mean $\overline{X}$ is the expected value $E_x$ of the M performance parameter data, namely, $E_x = \overline{X}$;

calculating a first order sample absolute central moment of the M performance parameter data by using $$L = \frac{1}{M}\sum_{i=1}^{M} |x_i - \overline{X}|,$$

wherein L is the first order sample absolute central moment of the M performance parameter data, $x_i$ is the i th performance parameter data, and a product of the first order sample absolute central moment L and $$\sqrt{\frac{\pi}{2}}$$

is the entropy $E_n$ of the M performance parameter data, namely $$E_n = \sqrt{\frac{\pi}{2}} * L = \sqrt{\frac{\pi}{2}} * \frac{1}{M}\sum_{i=1}^{M} |x_i - E_x|;$$

calculating a sample variance of the M performance parameter data by using $$S^2 = \frac{1}{M-1}\sum_{i=1}^{M}(x_i - \overline{X})^2,$$

wherein $S^2$ is the sample variance of the M performance parameter data, $\overline{X}$ is the sample mean of the M performance parameter data and $x_i$ is the i th performance parameter data, and a square root of a difference between the sample variance $S^2$ and the square of $E_n$ is the hyper entropy $H_e$ of the M performance parameter data, namely, $H_e = \sqrt{S^2 - E_n^2}$.

In a second possible implementation manner of the first aspect, in combination with the first possible implementation manner in the first aspect, the calculating N predicted performance parameter data of the network performance of the link according to the cloud model digital feature, specifically includes:

A. generating a normal random number $E_n'$, which takes the entropy $E_n$ as an expected value and the hyper entropy $H_e$ as a standard deviation, by using the entropy $E_n$ and the hyper entropy $H_e$ in the cloud model digital feature $\{E_x, E_n, H_e\}$;

B. generating a normal random number x, which takes the expected value $E_x$, as the expected value and the normal random number $E_n'$ as the standard deviation, by using the expected value $E_x$, and the normal random number $E_n'$ in the cloud model digital feature $\{E_x, E_n, H_e\}$;

C. calculating a certainty y of the normal random number x belonging to the network performance by using $$y = e^{\frac{-(x-E_x)^2}{2(E_n')^2}};$$

D. taking the normal random number x with the certainty y as a drop of the network performance;

E. repeating A~D until producing N drops as the N predicted performance parameter data.

In a third possible implementation manner of the first aspect, in combination with the first aspect, or in combination with the first or the second possible implementation manner in the first aspect, after the obtaining M performance parameter data of a link, the method further includes:

raising an alarm that the link exceeds the limit if there is data exceeding the preset upper limit value exists in the M performance parameter data.

In a fourth possible implementation manner of the first aspect, in combination with the third possible implementation manner in the first aspect, if there is data exceeding the preset upper limit value in the M performance parameter data, or there is the data exceeding the preset upper limit value in the N predicted performance parameter data, the method further includes: executing active-standby link switching if there is a standby link for the link.

In a second aspect, the present application provides a network performance prediction apparatus, wherein the network performance prediction apparatus including: an obtaining module, a first calculating module, a second calculating module and a processing module;

the obtaining module is configured to obtain M performance parameter data of a link;

the first calculating module is configured to calculate a cloud model digital feature of the network performance of the link according to the M performance parameter data obtained by the obtaining module;

the second calculating module is configured to calculate and obtain N predicted performance parameter data of the network performance of the link according to the cloud model digital feature calculated by the first calculating module;

the first determining module is configured to determine whether there is data exceeding a preset upper limit value in the N predicted performance parameter data calculated by the second calculating module;

the processing module is configured to raise a prediction alarm that the link has a risk of exceeding a limit if the first determining module determines there is the data exceeding the preset upper limit value in the N predicted performance parameter data, wherein M and N are preset positive integers.

In a first possible implementation manner of the second aspect, in combination with the second aspect, the cloud model digital feature of the network performance of the link calculated by the first calculating module includes: an expected value $E_x$, an entropy $E_n$ and a hyper entropy $H_e$;

the first calculating module is specifically configured to calculate a sample mean of the M performance parameter data by using $$\overline{X} = \frac{1}{M}\sum_{i=1}^{M}x_i,$$

wherein $\overline{X}$ is the sample mean of the M performance parameter data, $x_i$ is the i th performance parameter data, and the sample mean $\overline{X}$ is the expected value $E_x$ of the M performance parameter data, namely, $E_x = \overline{X}$;

the first calculating module is further configured to calculate a first order sample absolute central moment of the M performance parameter data by using $$L = \frac{1}{M}\sum_{i=1}^{M}|x_i - \overline{X}|,$$

wherein L is the first order sample absolute central moment of the M performance parameter data, $x_i$ is the i th performance parameter data, and a product of the first order sample absolute central moment L and $$\sqrt{\frac{\pi}{2}}$$

is the entropy $E_n$ of the M performance parameter data, namely $$E_n = \sqrt{\frac{\pi}{2}} * L = \sqrt{\frac{\pi}{2}} * \frac{1}{M}\sum_{i=1}^{M}|x_i - E_x|;$$

the first calculating module is further configured to calculate a sample variance of the M performance parameter data by using $$S^2 = \frac{1}{M-1}\sum_{i=1}^{M}(x_i - \overline{X})^2,$$

wherein $S^2$ is the sample variance of the M performance parameter data, $\overline{X}$ is the sample mean of the M performance parameter data and $x_i$ is the i th performance parameter data, and a square root of a difference between the sample variance $S^2$ and the square of $E_n$ is the hyper entropy $H_e$ of the M performance parameter data, namely $H_e = \sqrt{S^2 - E_n^2}$.

In a second possible implementation manner of the second aspect, in combination with the first possible implementation manner in the second aspect, the second calculating module is specifically configured to generate a normal random number $E_n'$, which takes the entropy $E_n$ as an expected value and the hyper entropy $H_e$ as a standard deviation, by using the entropy $E_n$ and the hyper entropy $H_e$ in the cloud model digital feature $\{E_x, E_n, H_e\}$;

the second calculating module is further configured to generate a normal random number x, which taking the expected value $E_x$ as the expected value and the normal random number $E_n'$ as the standard deviation, by using the expected value $E_x$ and the normal random number $E_n'$ in the cloud model digital feature $\{E_x, E_n, H_e\}$;

the second calculating module is further configured to calculate a certainty y of the normal random number x belonging to the network performance by using $$y = e^{\frac{-(x-E_X)^2}{2(E_n')^2}};$$

the second calculating module is further configured to take the normal random number x with the certainty y as a drop of the network performance;

the second calculating module is further configured to repeatedly produce N drops as the N predicted performance parameter data.

In a third possible implementation manner of the second aspect, in combination with the second aspect, or in combination with the first or the second possible implementation manner in the second aspect, the first determining module is further configured to determine whether there is the data exceeding the preset upper limit value in the M performance parameter data obtained by the obtaining module;

the processing module is further configured to raise an alarm that the link exceeds a limit if the first determining module determines that there is the data exceeding the preset upper limit value in the M performance parameter data.

In a fourth possible implementation manner of the second aspect, in combination with the third possible implementation manner in the second aspect, the processing module is further configured to execute active-standby link switching if there is a standby link for the link.

According to the network performance prediction method and apparatus provided in the present application, the network performance change trends is analyzed and the future network performance parameter data is predicted according to the real-time monitored data of the network performance of the link, and then based on the prediction whether the alarm and the protection switching are performed is determined.

DETAILED DESCRIPTION OF THE EMBODIMENTS

A detailed description of technical solutions of the present application will be further given below through the accompanying drawings and embodiments.

A method and apparatus of predicting network performance provided in the present application may be applied in various networks, predicted network performance may include performance parameters such as time delay, jitter, packet loss rate and the like, and performance of various types of network links may be predicted, including a physical link with transmission medium like an optical fiber, a pseudo-wire (Pseudo-Wire, PW), a main label switched path (Label Switched Path, LSP) and a standby LSP of a tunnel and the like.

Figure 1:
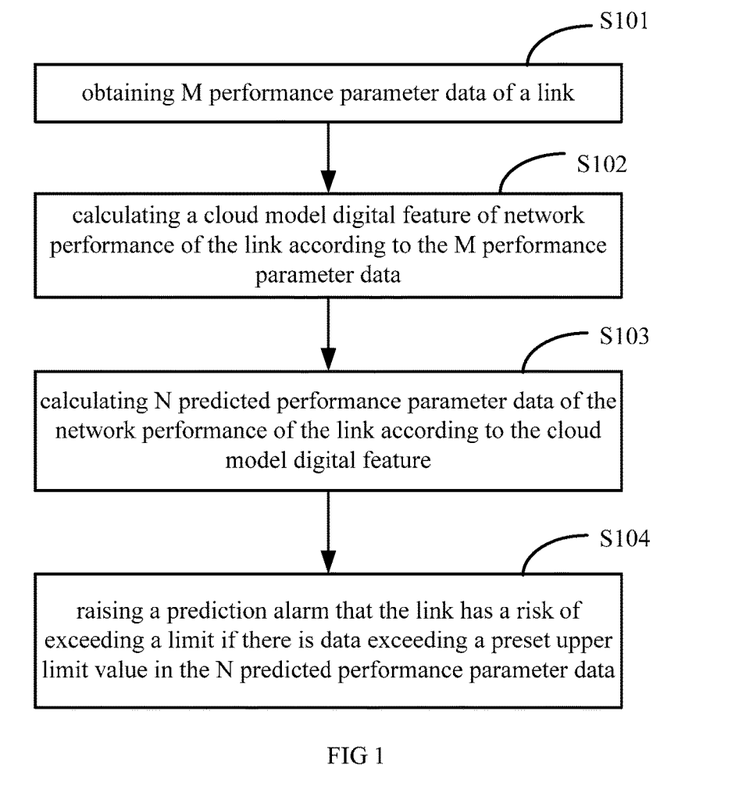
FIG. 1 is a flow diagram of a method of network performance prediction provided by an embodiment of the present application.

FIG. 1 is a flow diagram of a method of predicting network performance provided by an embodiment of the present application, including:

S101, obtaining M performance parameter data of a link.

The performance parameter data of the link may be obtained by adopting existing methods, for example, Ethernet network based operation and maintenance (operation and maintenance, OAM) function and mechanism, IP flow performance management (IP Flow Performance Management, IPFPM) and network quality analysis (Network Quality Analysis, NQA), etc.

The performance parameters of the link such as time delay are monitored in real time and the performance parameter data at each point in time is saved; optionally, the latest M performance parameter data of the link are obtained. M is a preset positive integer and may be set by a user according to actual use requirements.

Optionally, if an active link and a standby link are set in the network, the performance parameter data of the active link and the standby link are respectively obtained.

Optionally, after S101, the method further includes: determining whether there is data exceeding a preset upper limit value in the M performance parameter data of the link, and if it is determined that there is data exceeding the preset upper limit value, raising an alarm that the link exceeds a limit and returning to execute S101; otherwise, executing S102. The preset upper limit value is specifically set according to clients' requirement.

Further, if it is determined that there is the data exceeding the preset upper limit value in the M performance parameter data of the link, and there is a standby link for the link, active-standby link switching may be performed, namely, the state of the link is switched to standby and the state of the standby link of the link is switched to active.

S102, calculating a cloud model digital feature of the network performance of the link according to the M performance parameter data.

The cloud model digital feature of the network performance of the link includes: an expected value $E_x$, an entropy $E_n$ and a hyper entropy $H_e$ of the network performance data, and the cloud model digital feature is generally expressed as $\{E_x, E_n, H_e\}$.

Specifically, calculating the cloud model digital feature of the network performance of the link through a backward cloud generator by using the M performance parameter data includes the following steps:

S1021, calculating a sample mean of the M performance parameter data by using $$\overline{X} = \frac{1}{M} \sum_{i=1}^{M} x_i.$$

$\overline{X}$ is the sample mean of the M performance parameter data and $x_i$ is the i th performance parameter data, and the sample mean $\overline{X}$ is the expected value $E_x$ of the M performance parameter data, namely, $E_x = \overline{X}$.

S1022, calculating a first order sample absolute central moment of the M performance parameter data by using $$L = \frac{1}{M} \sum_{i=1}^{M} |x_i - \overline{X}|,$$

wherein L is the first order sample absolute central moment of the M performance parameter data, $\overline{X}$ is the sample mean of the M performance parameter data, $x_i$ is the i th performance parameter data, and a product of the first order sample absolute central moment L and $$\sqrt{\frac{\pi}{2}}$$

is the entropy $E_n$ of the M performance parameter data, namely, $$E_n = \sqrt{\frac{\pi}{2}} * L = \sqrt{\frac{\pi}{2}} * \frac{1}{M} \sum_{i=1}^{M} |x_i - E_x|.$$

S1023, calculating a sample variance of the M performance parameter data by using $$S^2 = \frac{1}{M-1} \sum_{i=1}^{M} (x_i - \overline{X})^2,$$

wherein $S^2$ is the sample variance of the M performance parameter data, $\overline{X}$ is the sample mean of the M performance parameter data, $x_i$ is the i th performance parameter data, a square root of a difference between the sample variance $S^2$ and the square of $E_n$ is the hyper entropy $H_e$ of the M performance parameter data, namely, $H_e = \sqrt{S^2 - E_n^2}$.

Optionally, the cloud model digital feature $\{E_x, E_n, H_e\}$ of the M performance parameter data on the active link and the standby link are respectively calculated through the aboved-mentioned S1021~S1023.

S103, calculating N predicted performance parameter data of the network performance of the link according to the cloud model digital feature.

N is a preset positive integer and may be set by a user according to an actual use requirement, and the value of N may equal to M or may not equal to M.

Specifically, calculating the N predicted performance parameter data of the network performance of the link by means of a forward cloud generator according to the cloud model digital feature includes the following steps:

S1031, generating a normal random number $E_n'$, which takes the entropy $E_n$ as an expected value and the hyper entropy $H_e$ as a standard deviation, by using the entropy $E_n$ and the hyper entropy $H_e$ in the cloud model digital feature $\{E_x, E_n, H_e\}$.

S1032, generating a normal random number x, which takes the expected value $E_x$ as an expected value and the normal random number $E_n'$ as a standard deviation, by using the expected value $E_x$ and the normal random number $E_n'$ in the cloud model digital feature $\{E_x, E_n, H_e\}$;

S1033, calculating a certainty y of the normal random number x belonging to the network performance by using $$y = e^{\frac{-(x-E_x)^2}{2(E_n')^2}};$$

S1034, taking the normal random number x with the certainty y as a drop of the network performance;

S1035, repeating S1031~S1034 until producing N drops as the N predicted performance parameter data.

Optionally, if the active link and the standby link are set in the network, the N drops on the active link and the standby link are respectively calculated through the above-mentioned S1031~S1035 and are respectively taken as the N predicted performance parameter data on the active link and the standby link.

S104, raising a prediction alarm that the link has a risk of exceeding the limit if there is data exceeding the preset upper limit value in the N predicted performance parameter data.

Specifically, it is determined whether there is the data exceeding the preset upper limit value in the N predicted performance parameter data, and if there is the data exceeding the preset upper limit value, the alarm that the link exceeds the limit is raised; if there is no data exceeding the preset upper limit value, return to execute S101.

For the condition that the active link and the standby link are set, it is respectively determined whether there is data exceeding the preset upper limit value in the N predicted performance parameter data on the active link and the standby link; if there is the data exceeding the preset upper limit value in the N predicted performance parameter data of the active link, the prediction alarm that the active link has a risk of exceeding the limit is raised; if there is data exceeding the preset upper limit value in the N predicted performance parameter data of the standby link, the prediction alarm that the standby link has a risk of exceeding the limit is raised.

If it is determined that there is the data exceeding the preset upper limit value in the N predicted performance parameter data of the active link, the method may further include: comparing the number of the data exceeding the preset upper limit value on the active link with the number of data exceeding the preset upper limit value on the standby link, if the number of the data exceeding the preset upper limit value on the active link is more, which indicates that a risk on the active link is higher, then executing the active-standby link switching; otherwise, which indicates that the risk on the active link is lower, returning to execute S101.

According to the method of predicting network performance provided by the embodiments of the present application, a change trend of the network performance is analyzed according to the real-time monitored data of the network performance of the link to predict future performance parameter data, and it is determined based on the prediction whether the alarm is raised and the protection switching are performed, and thus the problem of failing to timely pre-alarm or perform protection switching for time delay in a current network may be solved. In addition, since the performance parameter data predicted and obtained on the active link and the standby link may be compared so as to choose a link with a lower risk. Therefore, setting requirement of a switching threshold (upper limit value) in the present application is not very strict, thus avoiding the problem that the switching threshold is difficult to be determined.

The network performance prediction method provided by the present application is described above in detail and a detailed description of a network performance prediction apparatus provided by the present application will be given below.

Figure 2:
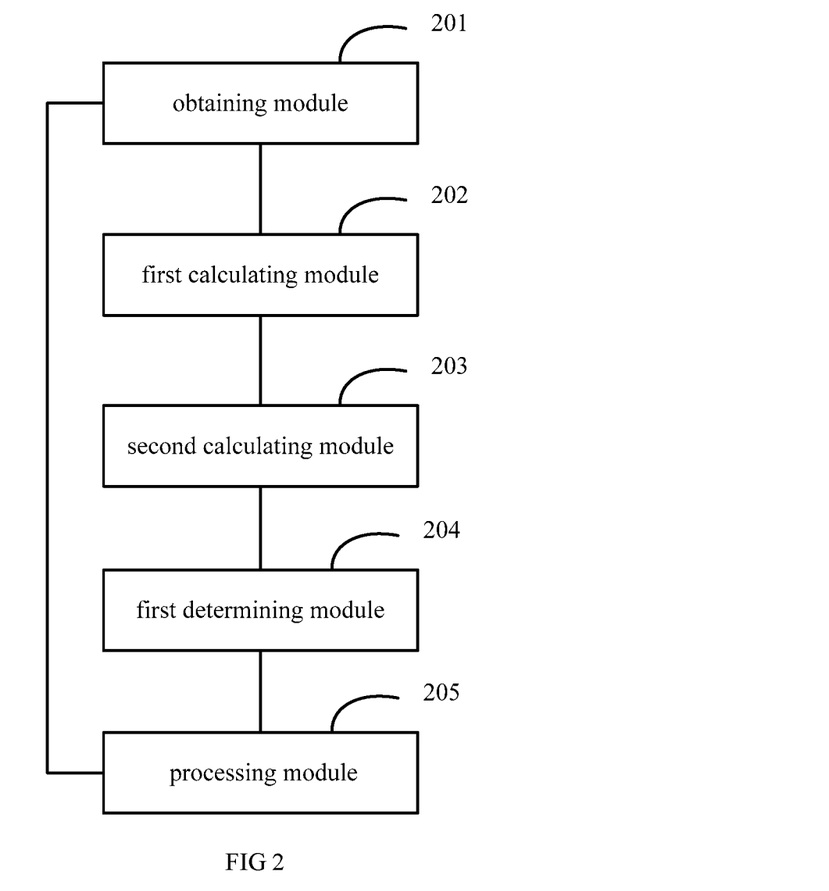
FIG. 2 is a schematic diagram of an apparatus of network performance prediction provided by an embodiment of the present application.

FIG. 2 is a schematic diagram of an apparatus of predicting network performance provided by a embodiment of the present application, configured to implement the method as shown in FIG. 1 of the present application. As shown in FIG. 2, the apparatus includes: an obtaining module 201, a first calculating module 202, a second calculating module 203, a first determining module 204 and a processing module 205.

The obtaining module 201 is configured to obtain M performance parameter data of a link.

The first calculating module 202 is configured to calculate a cloud model digital feature of the network performance of the link according to the M performance parameter data obtained by the obtaining module 201;

The second calculating module 203 is configured to calculate and obtain N predicted performance parameter data of the network performance of the link according to the cloud model digital feature calculated by the first calculating module 202;

The first determining module 204 is configured to determine whether there is data exceeding a preset upper limit value in the N predicted performance parameter data calculated by the second calculating module 203;

The processing module 205 is configured to raise a prediction alarm that the link has a risk of exceeding the limit if the first determining module 204 determines that there is the data exceeds the preset upper limit value in the N predicted performance parameter data.

M and N are preset positive integers and may be set by a user according to actual use requirements; the value of N may equal to M or may not equal to M.

The obtaining module 201 may obtain the performance parameter data on the link by adopting the existing methods based on the Ethernet network OAM function and mechanism, IPFPM and NQA, etc.

The apparatus monitors the performance parameters of the link in real time, such as time delay, and saves the performance parameter data of each point in time; optionally, the obtaining module 201 obtains the latest M performance parameter data of the link. If a standby link is set for the link, the obtaining module 201 is specifically configured to respectively obtain the M performance parameter data of an active link and M performance parameter data of the standby link.

Optionally, the first determining module 204 is connected to the obtaining module 201, and is configured to determine whether there is the data exceeding the preset upper limit value in the M performance parameter data of the link obtained by the obtaining module 201; the processing module 205 is further configured to raise the alarm that the link exceeds the limit and return to the obtaining module 201 if the first determining module 204 determines there is the data exceeding the preset upper limit value in the M performance parameter data; otherwise, enter the first calculating module 202.

The preset upper limit value is specifically set according to clients' requirement.

Further, if first determining module determines that there is the data exceeding the preset upper limit value in the M performance parameter data of the link, and the link has the standby link, the processing module 205 is further configured to perform active-standby link switching, namely the state of the link is switched to standby and the state of the standby link for the link is switched to active.

The cloud model digital feature of the network performance of the link includes: an expected value $E_x$, an entropy $E_n$ and a hyper entropy $H_e$ of the network performance data, and the cloud model digital feature is generally expressed as $\{E_x, E_n, H_e\}$.

Specifically, the first calculating module 202 is configured to calculate the cloud model digital feature of the network performance of the link through a backward cloud generator according to the M performance parameter data, including:

calculating a sample mean of the M performance parameter data by using $$\overline{X} = \frac{1}{M}\sum_{i=1}^{M} x_i,$$

wherein $\overline{X}$ is the sample mean of the M performance parameter data, $x_i$ is the i th performance parameter data, and the sample mean $\overline{X}$ is the expected value $E_x$ of the M performance parameter data, namely $E_x = \overline{X}$.

calculating a first order sample absolute central moment of the M performance parameter data by using $$L = \frac{1}{M}\sum_{i=1}^{M} |x_i - \overline{X}|,$$

wherein L is the first order sample absolute central moment of the M performance parameter data, $\overline{X}$ is the sample mean of the M performance parameter data, $x_i$ is the i th performance parameter data, and a product of the first order sample absolute central moment L and $$\sqrt{\frac{\pi}{2}}$$

is the entropy $E_n$ of the M performance parameter data, namely $$E_n = \sqrt{\frac{\pi}{2}} * L = \sqrt{\frac{\pi}{2}} * \frac{1}{M}\sum_{i=1}^{M}|x_i - E_x|.$$

calculating a sample variance of the M performance parameter data by using $$S^2 = \frac{1}{M-1}\sum_{i=1}^{M}(x_i - \overline{X})^2,$$

wherein $S^2$ is the sample variance of the M performance parameter data, $\overline{X}$ is the sample mean of the M performance parameter data, $x_i$ is the i th performance parameter data, and a square root of a difference between the sample variance $S^2$ and the square of $E_n$ is the hyper entropy $H_e$ of the M performance parameter data, namely, $H_e = \sqrt{S^2 - E_n^2}$.

Optionally, the first calculating module 202 is configured to respectively calculate and obtain the cloud model digital feature $\{E_x, E_n, H_e\}$ of M performance parameter data on the active link and the standby link.

Specifically, the second calculating module 203 is configured to calculate and obtain the N predicted performance parameter data of the network performance of the link by means of a forward cloud generator according to the cloud model digital feature, including:

generating a normal random number $E_n'$, which takes the entropy $E_n$ as an expected value and the hyper entropy $H_e$ as a standard deviation, by using the entropy $E_n$ and the hyper entropy $H_e$ in the cloud model digital feature $\{E_x, E_n, H_e\}$;

generating a normal random number x, which takes the expected value $E_x$ as the expected value and the normal random number $E_n'$ as the standard deviation, by using the expected value $E_x$ and the normal random number $E_n'$ in the cloud model digital feature $\{E_x, E_n, H_e\}$.

calculating a certainty y of the normal random number x belonging to the network performance by using $$y = e^{\frac{-(x-E_x)^2}{2(E_n')^2}};$$

taking the normal random number x with the certainty y as a drop of the network performance; repeatedly producing N drops as the N predicted performance parameter data.

Optionally, the second calculating module 203 is configured to respectively calculate and obtain the N drops on the active link and the standby link and the N drops are taken as the N predicted performance parameter data on the active link and the standby link.

For the condition that the active link and the standby link are set, the first determining module 204 is configured to respectively determine whether there is the data exceeding the preset upper limit value in the N predicted performance parameter data on the active link and the standby link.

If the first determining module 204 determines that there is the data exceeding the preset upper limit value in the N predicted performance parameter data of the active link, the processing module 205 is configured to raise the prediction alarm that the active link has a risk of exceeding the limit.

If the first determining module 204 determines that there is the data exceeding the preset upper limit value in the N predicted performance parameter data of the standby link, the processing module 205 is configured to raise the prediction alarm that the standby link has a risk of exceeding the limit.

If the first determining module 204 determines that there is the data exceeding the preset upper limit value in the N predicted performance parameter data of the active link, the apparatus of predicting network performance according to the present application may further include: a second determining module, configured to compare the number of the data exceeding the preset upper limit value on the active link with the number of the data exceeding the preset upper limit value on the standby link. If the number on the active link is more, it indicates that a risk is higher on the active link, and then the processing module 205 executes the active-standby link switching; otherwise, it indicates that the risk is lower on the active link, returns to the obtaining module 201.

Figure 3:
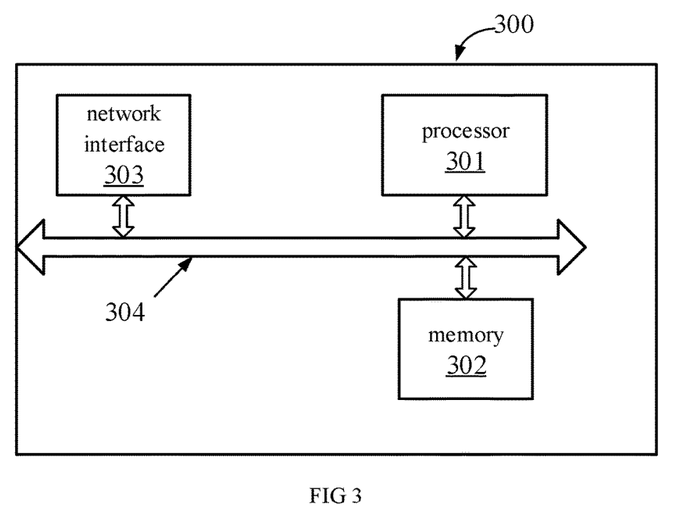
FIG. 3 is a schematic structural diagram of an apparatus of the network performance prediction provided by an embodiment of the present application.

FIG. 3 is a schematic structural diagram of a apparatus of predicting network performance provided by an embodiment of the present application, configured to execute the method as shown in FIG. 1 of the present application. As shown in FIG. 3, the apparatus 300 of predicting network performance includes a processor 301, a memory 302, a network interface 303 and a bus 304.

The memory 302 is configured to store a program. Specifically, the program may include a program code, wherein the program code includes a computer operating instruction. The memory 302 probably includes a high-speed random access memory (random access memory, RAM for short), and further probably includes a non-volatile memory (non-volatile memory), for example at least one magnetic disk memory. The memory 302 may further include a device driver.

The network interface 303 is configured to communicate with other devices.

The processor 301 executes the program stored in the memory 302, configured to perform a method of predicting network performance provided in the embodiments of the present application, including:

obtaining M performance parameter data of a link;

calculating a cloud model digital feature of the network performance of the link according to the M performance parameter data;

calculating N predicted performance parameter data of the network performance of the link according to the cloud model digital feature;

raising a prediction alarm that the link has a risk of exceeding a limit if there is data exceeding a preset upper limit value in the N predicted performance parameter data, wherein M and N are preset positive integers.

The cloud model digital feature of the network performance of the link includes: an expected value $E_x$, an entropy $E_n$ and a hyper entropy $H_e$;

the calculating a cloud model digital feature of network performance of the link according to the M performance parameter data, specifically includes:

calculating a sample mean of the M performance parameter data by using $$\overline{X} = \frac{1}{M}\sum_{i=1}^{M}x_i,$$

wherein $\overline{X}$ is the sample mean of the M performance parameter data, $x_i$ is the i th performance parameter data, and the sample mean $\overline{X}$ is the expected value $E_x$ of the M performance parameter data, namely $E_x = \overline{X}$;

calculating a first order sample absolute central moment of the M performance parameter data by using $$L = \frac{1}{M} \sum_{i=1}^{M} |x_i - \overline{X}|,$$

wherein L is the first order sample absolute central moment of the M performance parameter data, $x_i$ is the i th performance parameter data; a product of the first order sample absolute central moment L and $$\sqrt{\frac{\pi}{2}}$$

is the entropy $E_n$ of the M performance parameter data, namely, $$E_n = \sqrt{\frac{\pi}{2}} * L = \sqrt{\frac{\pi}{2}} * \frac{1}{M} \sum_{i=1}^{M} |x_i - E_x|;$$

calculating a sample variance of the M performance parameter data by using $$S^2 = \frac{1}{M-1} \sum_{i=1}^{M} (x_i - \overline{X})^2,$$

wherein $S^2$ is the sample variance of the M performance parameter data, $\overline{X}$ is the sample mean of the M performance parameter data and $x_i$ is the i th performance parameter data, and a square root of a difference between the sample variance $S^2$ and the square of $E_n$ is the hyper entropy $H_e$ of the M performance parameter data, namely, $H_e = \sqrt{S^2 - E_n^2}$.

the calculating N predicted performance parameter data of the link according to the cloud model digital feature, specifically includes:

A. generating a normal random number $E_n'$, which takes the entropy $E_n$ as an expected value and the hyper entropy $H_e$ as a standard deviation, by using the entropy $E_n$ and the hyper entropy $H_e$ in the cloud model digital feature $\{E_x, E_n, H_e\}$;

B. generating a normal random number x, which takes the expected value $E_x$ as the expected value and the normal random number $E_n'$ as the standard deviation, by using the expected value $E_x$ and the normal random number $E_n'$ in the cloud model digital feature $\{E_x, E_n, H_e\}$.

C. calculating a certainty y of the normal random number x belonging to the network performance by using $$y = e^{\frac{-(x-E_X)^2}{2(E_n')^2}};$$

D. taking the normal random number x with the certainty y as a drop of the network performance;

E. repeating A~D until producing N drops as the N predicted performance parameter data.

After the obtaining M performance parameter data of a link, it further includes:

determining whether there is the data exceeding the preset upper limit value in the M performance parameter data, and raising an alarm that the link exceeds a limit if there is the data exceeding the preset upper limit value.

Further, if there is the data exceeding the preset upper limit value in the M performance parameter data, or there is the data exceeding the preset upper limit value exists in the N predicted performance parameter data, the method further includes: executing active-standby link switching if there is a standby link for the link.

According to the method and apparatus of predicting network performance provided in the present application, a change trend of the network performance is analyzed according to real-time monitored data of the network performance of the link to predict future parameter data the network performance is predicted, and it is determined based on the prediction whether an alarm is raised and protection switching is performed, thus the problem of failing to timely raise an alarm or perform protection switching for time delay in current network may be solved.

Those skilled in the art may further realize that the units and algorithmic steps of each example described in conjunction with the embodiments of the present application may be realized by electronic hardware and computer software or a combination of computer software and electronic hardware. In order to clearly illustrate the interchangeability of hardware and software, composition and steps of each example have been generally described in the above description in accordance with the function. Whether these functions are executed in hardware or software mode depends on the specific applications and design constraint conditions of the technical solution. For each specific application, professionals may implement the described functions by different methods, but this implementation shall not be considered as being beyond the scope of the present application.

The methods or algorithmic steps described in conjunction with the disclosed embodiments of the present application may be realized by hardware and a software module performed by a processor or a combination of the two. The software module may be placed in a storage medium, such as a random access memory (RAM), a memory, a read-only memory (ROM), an electrically programmable ROM, an electrically erasable programmable ROM, a register, a hard disk, a removable disk, a CD-ROM or any other forms of storage medium commonly known in the art.

The foregoing specific implementations has further illustrated the objective, technical solution and beneficial effects of the present application in detail. It should be understood that the foregoing description is specific implementations of the present application only, but the protection scope of the present application is not limited to this, any modifications, equivalent substitutions and improvements and the like to be made within the spirit and principle of the present application shall fall within the protection scope of the present application.

What is claimed is:
1. A method of predicting network performance, comprising:
   obtaining, by a network performance prediction apparatus, M pieces of performance parameter data of a link;
   calculating, by the apparatus, a cloud model digital feature of network performance of the link according to the M pieces of performance parameter data;

calculating, by the apparatus, N pieces of predicted performance parameter data of the network performance of the link according to the cloud model digital feature; and raising, by the apparatus, a prediction alarm that the link has a risk of exceeding a limit if there is data exceeding a preset upper limit value in the N pieces of predicted performance parameter data, wherein M and N are preset positive integers;

executing, by the apparatus, when the data in the M pieces of performance parameter data exceeds the preset upper limit value, or when the data in the N pieces of predicted performance parameter data exceeds the preset upper limit value, active-standby link switching if there is a standby link for the link;

wherein the cloud model digital feature of the network performance of the link comprises: an expected value $E_x$, an entropy $E_n$ and a hyper entropy $H_e$ of the M pieces of network performance data; and wherein the calculating a cloud model digital feature of network performance of the link according to the M pieces of performance parameter data comprises:

calculating a sample mean of the M pieces of performance parameter data by using $$\overline{X} = \frac{1}{M}\sum_{i=1}^{M} x_i,$$

wherein $\overline{X}$ is the sample mean of the M pieces of performance parameter data, $x_i$ is the i th piece of performance parameter data, and the sample mean $\overline{X}$ is the expected value $E_x$ of the M pieces of performance parameter data, $E_x = \overline{X}$;

calculating a first order sample absolute central moment of the M pieces of performance parameter data by using $$L = \frac{1}{M}\sum_{i=1}^{M} |x_i - \overline{X}|,$$

wherein L is the first order sample absolute central moment of the M pieces of performance parameter data, $x_i$ is the i th piece of performance parameter data, and a product of the first order sample absolute central moment L and $$\sqrt{\frac{\pi}{2}}$$

is the entropy $E_n$ of the M pieces of performance parameter data, $$E_n = \sqrt{\frac{\pi}{2}} * L = \sqrt{\frac{\pi}{2}} * \frac{1}{M}\sum_{i=1}^{M} |x_i - E_x|;$$

and
calculating a sample variance of the M pieces of performance parameter data by using $$S^2 = \frac{1}{M-1}\sum_{i=1}^{M} (x_i - \overline{X})^2,$$

wherein $S^2$ is the sample variance of the M pieces of performance parameter data, $\overline{X}$ is the sample mean of the M pieces of performance parameter data and $x_i$ is the i th piece of performance parameter data, and a square root of a difference between the sample variance $S^2$ and the square of $E_n$ is the hyper entropy $H_e$ of the M pieces of performance parameter data, $H_e = \sqrt{S^2 - E_n^2}$.

2. The method of claim 1, wherein the calculating N pieces of predicted performance parameter data of the network performance of the link according to the cloud model digital feature comprises:

generating, by the apparatus, a normal random number $E_n'$, which takes the entropy $E_n$ as an expected value and the hyper entropy $H_e$ as a standard deviation, by using the entropy $E_n$ and the hyper entropy $H_e$ in the cloud model digital feature $\{E_x, E_n, H_e\}$;

generating, by the apparatus, a normal random number x, which takes the expected value $E_x$ as the expected value and the normal random number $E_n'$ as the standard deviation, by using the expected value $E_x$ and the normal random number $E_n'$ in the cloud model digital feature $\{E_x, E_n, H_e\}$;

calculating, by the apparatus, a certainty y of the normal random number x belonging to the network performance by using $$y = e^{\frac{-(x-E_x)^2}{2(E_n')^2}};$$

taking, by the apparatus, the normal random number x with the certainty y as a drop of the network performance.

3. The method of claim 1, wherein after the obtaining M pieces of performance parameter data of a link, the method further comprises:

raising, by the apparatus, an alarm that the link exceeds the limit if there is data exceeding the preset upper limit value in the M pieces of performance parameter data.

4. The method of claim 2, wherein after the obtaining M pieces of performance parameter data of a link, the method further comprises:

raising, by the apparatus, an alarm that the link exceeds the limit if there is data exceeding the preset upper limit value in the M pieces of performance parameter data.

5. A network performance prediction apparatus, comprising: a processor and a memory having program code stored therein, wherein the program code executed on the processor configures the apparatus to;

obtain M pieces of performance parameter data of a link;
calculate a cloud model digital feature of network performance of the link according to the M pieces of performance parameter data;
calculate N pieces of predicted performance parameter data of the network performance of the link according to the cloud model digital feature;
determine whether there is data exceeding a preset upper limit value in the N pieces of predicted performance parameter data;

raise a prediction alarm that the link has a risk of exceeding a limit if there is the data exceeding the preset upper limit value in the N pieces of predicted performance parameter data, wherein M and N are preset positive integers;

wherein the code executed on the processor further configures the apparatus to execute, when the data in the M pieces of performance parameter data exceeds the preset upper limit value, or when the data in the N pieces of predicted performance parameter data exceeds the preset upper limit value, active-standby link switching if there is a standby link for the link;

wherein the cloud model digital feature of the network performance of the link calculated by the first calculating module comprises: an expected value $E_x$, an entropy $E_n$ and a hyper entropy $H_e$ of the M pieces of performance parameter data;

the code executed on the processor configures the apparatus to calculate a sample mean of the M pieces of performance parameter data by using $$\overline{X} = \frac{1}{M}\sum_{i=1}^{M} x_i,$$

wherein $\overline{X}$ is the sample mean of the M pieces of performance parameter data, $x_i$ is the i th piece of performance parameter data, and the sample mean $\overline{X}$ is the expected value $E_x$ of the M pieces of performance parameter data, $E_x = \overline{X}$;

the code executed on the processor further configures the apparatus to calculate a first order sample absolute central moment of the M pieces of performance parameter data by using $$L = \frac{1}{M}\sum_{i=1}^{M} |x_i - \overline{X}|,$$

wherein L is the first order sample absolute central moment of the M pieces of performance parameter data, $x_i$ is the i th piece of performance parameter data, and a product of the first order sample absolute central moment L and $$\sqrt{\frac{\pi}{2}}$$

is the entropy $E_n$ of the M pieces of performance parameter data, $$E_n = \sqrt{\frac{\pi}{2}} * L = \sqrt{\frac{\pi}{2}} * \frac{1}{M}\sum_{i=1}^{M} |x_i - E_x|;$$

the code executed on the processor further configures the apparatus to calculate a sample variance of the M pieces of performance parameter data by using $$S^2 = \frac{1}{M-1}\sum_{i=1}^{M} (x_i - \overline{X})^2,$$

wherein $S^2$ is the sample variance of the M pieces of performance parameter data, $\overline{X}$ is the sample mean of the M pieces of performance parameter data, $x_i$ is the i th piece of performance parameter data, and a square root of a difference between the sample variance $S^2$ and the square of $E_n$ is the hyper entropy $H_e$ of the M pieces of performance parameter data, $H_e = \sqrt{S^2 - E_n^2}$.

6. The apparatus of claim 5, wherein the code executed on the processor configures the apparatus to generate a normal random number $E_n'$, which takes the entropy $E_n$ as an expected value and the hyper entropy $H_e$ as a standard deviation, by using the entropy $E_n$ and the hyper entropy $H_e$ in the cloud model digital feature $\{E_x, E_n, H_e\}$;

the code executed on the processor further configures the apparatus to generate a normal random number x, which taking the expected value $E_x$ as the expected value and the normal random number $E_n'$ as the standard deviation, by using the expected value $E_x$ and the normal random number $E_n'$ in the cloud model digital feature $\{E_x, E_n, H_e\}$;

the code executed on the processor further configures the apparatus to calculate a certainty y of the normal random number x belonging to the network performance by using $$y = e^{\frac{-(x-E_X)^2}{2(E_n')^2}};$$

the code executed on the processor further configures the apparatus to take the normal random number x with the certainty y as a drop of the network performance.

7. The apparatus of claim 5, wherein the code executed on the processor further configures the apparatus to determine whether there is data exceeding the preset upper limit value in the M pieces of performance parameter data;

the code executed on the processor further configures the apparatus to raise an alarm that the link exceeds a limit when the data in the M pieces of performance parameter data exceeds the preset upper limit value.

8. The apparatus of claim 6, wherein the code executed on the processor further configures the apparatus to determine whether there is the data exceeding the preset upper limit value in the M pieces of performance parameter data;

the code executed on the processor further configures the apparatus to raise an alarm that the link exceeds a limit when the data in the M pieces of performance parameter data exceeds the preset upper limit value.

* * * * *